Dec. 26, 1939.  J. MORKOSKI  2,184,431
REGULATING MECHANISM
Filed Aug. 2, 1937  2 Sheets-Sheet 1
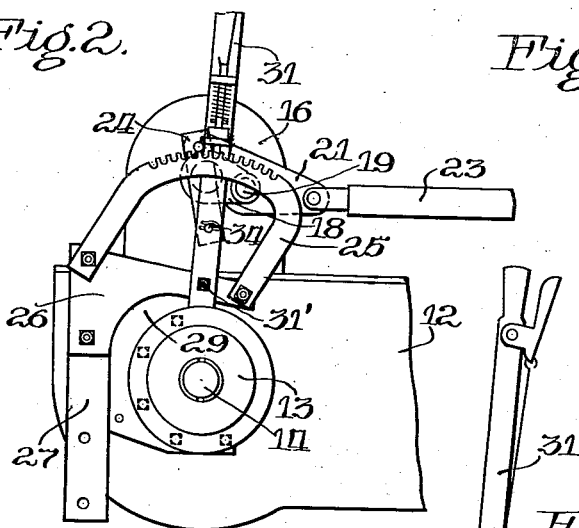
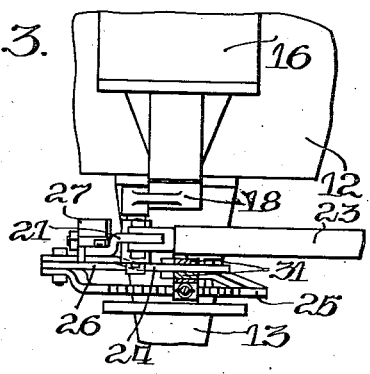
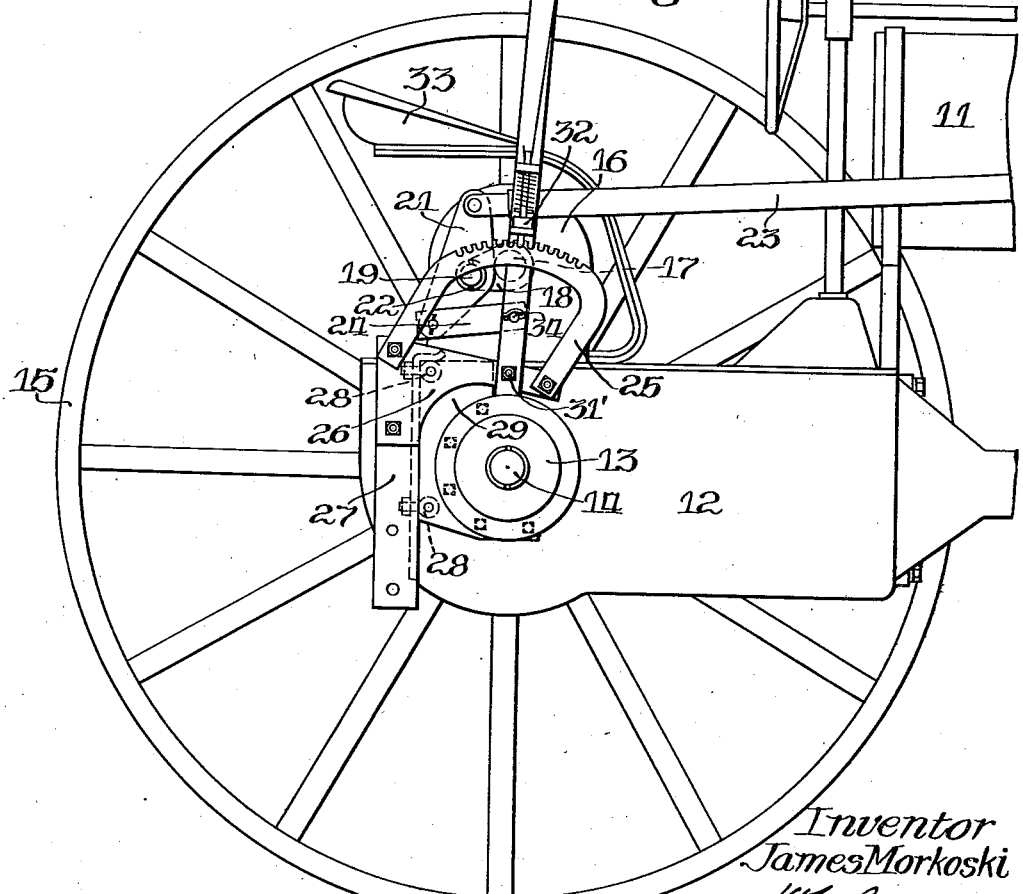
Inventor
James Morkoski
By V. F. Lasueyne
Att'y.

Dec. 26, 1939.   J. MORKOSKI   2,184,431
REGULATING MECHANISM
Filed Aug. 2, 1937   2 Sheets-Sheet 2

Inventor
James Morkoski.
By [signature]
Att'y.

Patented Dec. 26, 1939

2,184,431

UNITED STATES PATENT OFFICE 2,184,431

REGULATING MECHANISM

James Morkoski, Canton, Ill., assignor to International Harvester Company, a corporation of New Jersey Application August 2, 1937, Serial No. 156,903

16 Claims. (Cl. 97—50)

This invention relates to manual regulating mechanisms for tractor implements having implement structures movable by means of a power lift device, wherein a regulating adjustment of the connection between the movable structure and the power lift device is desired.

The regulating mechanisms, heretofore, have been of the type which swing or move with the power lift device when the same is operated to move the movable implement structure. With such structures, operators of tractor implements who at the time are busy with other mechanisms or perhaps careless, have placed their limbs in the path of movement and received serious injuries therefrom. These structures often contain long projected adjusting levers and the arc of movement of the same on their outer extremities is quite considerable. The power device often operates with a very quick motion so as to give considerable speed to the adjusting lever.

It is, therefore, the principal object of this invention to provide a manual regulating or adjusting mechanism which will remain stationary when the power device operates to move the structure connected to it.

It is another object of this invention to provide an adjusting mechanism which is of simple construction and particularly adaptable for use in connection with tractors where a power device serves to vertically adjust an implement connected to the tractor.

In general, the invention comprises a power lift device having a crank arm, a structure adapted to be moved by the power device, linkage means interconnecting the power device and the movable structure and means associated with the interconnecting means for regulating the movable structure. This regulating means comprises a quadrant and manual adjusting lever, the lever projecting to points near the operator's station on the tractor, but is so connected to the connecting means between the power lift device and movable structure that movement of the power lift device will not cause movement of the regulating mechanism, particularly of the adjusting lever. Thus the adjusting lever remains stationary during the operation of the power device.

While reference is being made to a tractor, it should be seen that the invention is also capable of being adapted to any ground engaging implement carrying structure, or a mere implement frame not self-propelled but having an individual ground working tool or other device thereon adapted for movement with respect to its frame.

For a better understanding of the invention, reference is made to the following description taken in connection with the accompanying drawings, in which:

Figure 1 is a side elevational view of a portion of a tractor showing the arrangement of the linkage for adjusting implements mounted for movement on the front of the tractor;

Figure 2 is another elevational view showing the mechanism after the power lift has been operated to raise the front implements, the adjusting lever having retained the same position in which it is shown in Figure 1;

Figure 3 is a top view of the regulating mechanism in its position shown in Figure 1;

Figure 4:
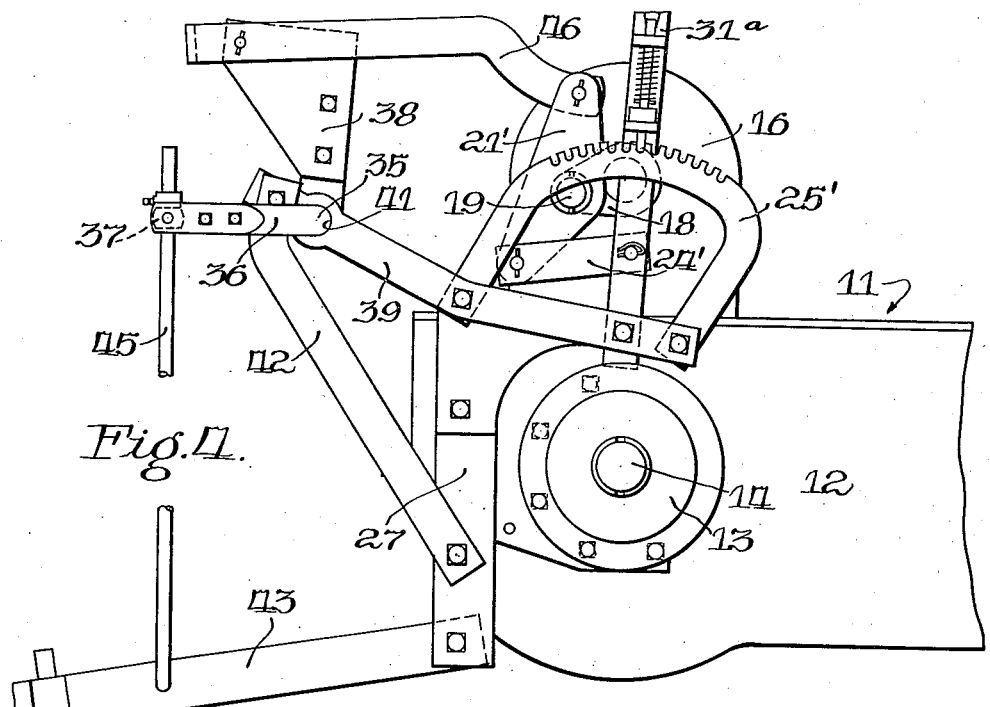
Figure 4 is a side elevational view of the same regulating mechanism adapted for adjusting implements on the rear of the tractor; and, Figure 5 is a view similar to Figure 4 of the mechanism after having been operated by the power lift to raise the rear implements on the tractor.

Referring to the drawings, there is shown a tractor or implement-carrying frame 11 having a differential and transmission housing 12 and a rear axle housing 13 through which extends a rear driving axle 14 for the tractor wheels 15, only one of which is shown. Mounted for operation on the rear transmission and differential housing 12 is a power lift device 16 which may be of any conventional type operated either mechanically or hydraulically by the tractor at the will of the operator. The power lift device or power means 16 has a laterally extending driving shaft 17 with a crank arm 18 fixed thereto. Journaled on a pin 19 carried by the power lift crank arm 18 is a bell crank or angularly adjustable means 21 which may be easily placed thereon or removed by simple withdrawal of a cotter pin 22. Through this bell crank 21, the power lift device is connected to a lift pipe or rod 23 with implements mounted for vertical adjustment on the front of the tractor. The movement of this connecting means or push pipe 23 in a forward direction effects a raising movement of the implements on the tractor, and movement of the pipe to the rear effects lowering of the implements into a ground engaging position. The front implements are not shown in the drawings, but it shall be understood that they may be any of the common implements mounted for adjustment on the front of the tractor and so linked with the power device that movement of the same will raise and lower them. The bell crank 21 carries with it a pivotally connected link 24.

The regulating mechanism of the present invention comprises, in general, a quadrant 25, which is mounted on a plate member 26 fixed to a quick attachable frame member 27, which is easily detached or attached by means of swing bolts 28 to plate members 29 fixed to the axle housing 13, and an adjusting lever 31 having a latch 32 pivoted at its lower end to the plate member 26, as indicated at 31', and adapted to cooperate with the quadrant 25. It will, therefore, be seen that the quadrant and adjusting lever means, along with the plate member 26, are detachable from the tractor. The adjusting lever 31 is located on the tractor near the operator's station 33.

The link 24 is now pivotally connected to the lower end of the adjusting lever 31 by a pin 34. This associates the regulating or adjusting mechanism with the bell crank 21 and lift pipe 23 and they all form means for connecting the crank arm 18 of the power lift device with the front implements or movable structure on the front of the tractor. It will thus be seen that the movement of the adjusting lever 31 forwardly of the tractor or to the right as viewed in the drawings about the pivot 31' and on the quadrant 25 will adjust the bell crank 21 in a counter-clockwise direction about the crank arm pin 19 and cause the lift pipe 23 to be moved rearwardly to lower the implements slightly on the tractor and thereby increase the working depth of the same assuming the front implements are mounted in the conventional form such as shown in the Patent 1,911,306 to S. W. Cady. A movement of the adjusting lever rearwardly of the tractor will effect a turning movement of the bell crank 21 in a clockwise direction on the crank arm pin 19 to move the lift pipe 23 forwardly and thereby decrease the working depth of the implement in a manner well understood in this art. This adjustment effects the amount of movement of the implement toward the ground.

After the proper depth adjustment of the implements is decided upon, the implements are now ready to be raised and lowered by the power lift device. When the power lift device is operated to raise the implement, the crank arm 18 rotates with the power lift shaft 17 through 180°, more or less, so that the bell crank 21 takes the position shown in Figure 2. The exact angular position of the bell crank 21, when extended as shown in Figure 2 or in the position shown in Figure 1, will depend upon the angular adjustment of the adjusting lever 31 on the quadrant.

Figure 5:
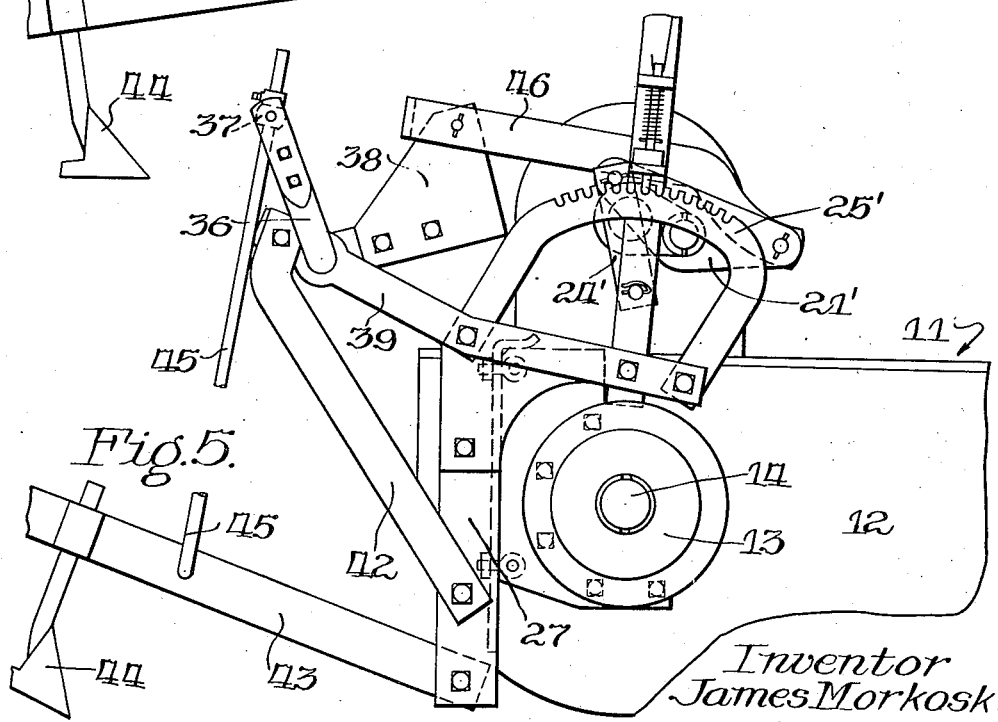

In Figures 4 and 5, there is shown the same regulating mechanism, as shown in Figures 1 to 3, but hooked up for regulation of implements or movable structure mounted on the rear of the tractor. While separate showing has been made for implements on the front and rear of the tractor, it should be understood that the same mechanism may be used for providing regulation to the implements adapted to be jointly or simultaneously operated by the power device.

In Figures 4 and 5, the same reference characters will be used for like parts, as shown in Figures 1 to 3. The attachable frame structure 27, in this form, not only carries the regulating means, but also a rockshaft 35 having an arm 36 carrying a trunnion 37 and having a lifting arm 38. The rockshaft 35 is supported on the quick attachable frame structure 27 by means of a rearwardly extending member 39 having its forward end fixed to the plate member 26, between the plate member and on which are fixed the ends of the quadrants 25' and the end of an adjusting lever 31a. The rear end of the member 39 has a hole 41 in which the rockshaft 35 is journaled, and is braced on the attachable frame 27 by a brace member 42. Pivoted to the lower end of the quick attachable frame 27 is a movable or implement-carrying structure 43 having the implements 44. A lifting link 45 connects the structure 43 with the trunnion 37 on the rockshaft arm 36. The lift arm 38 fixed to the rockshaft is connected to a bell crank 21' through a longitudinally extending link 46. It should now be seen that when the crank arm 18 of the power lift device 16 is rotated, a raising or lowering movement will be given to the rear implements. The regulating mechanism is similarly associated with the means connecting the power device with the implement mounted for movement on the tractor.

As shown in Figure 4, the rear implements are in ground-engaging position. An adjustment of the adjusting lever 31a in a forward direction will cause rotation of the bell crank 21' in a counter-clockwise direction about the crank arm pin 19, the two being connected together by a link 24', and will lower the rear implements, thus increasing the working engagement of the same with the ground. Movement of the adjusting lever 31a to the rear will cause rotation of the bell crank arm 21' about the crank arm pin 19 in a clockwise direction and thus decrease the working engagement of the implements 44 with the ground.

When the power lift 16 operates to raise the implement to a transport position on the tractor, the rockshaft 35 will be operated by the link member 46 which in turn will lift the implement carrying structure 43 about its pivot connection with the attachable frame structure 27, so that the same will take the position shown in Figure 5. It should be noted that after this operation has taken place, the adjusting lever 31a remains in the same position, as shown in Figure 4.

It should now be evident from the foregoing description that the structure described provides a regulating mechanism, simple in construction, for the regulation of the working depth of implements carried by a tractor or other instrumentality, wherein the projected lever remains stationary upon adjustment of the movable structure by the power device.

It should now be understood that various changes and modifications shall be made without departing from the spirit and scope of the appended claims.

What is claimed is:

1. In a tractor including a power device having a crank arm, an implement carried on the tractor for movement by the power device, linkage means connecting the crank arm of the power device with the implement structure to actuate the same including a bell crank lever journaled on the crank arm, and manual means for regulating the working position of the implement structure operatively connected to said bell crank lever to adjust the relative position of the same on the crank arm, said regulating means being so connected with the crank arm as to remain stationary during movement of the implement structure by the power device.

2. In combination, a tractor, a ground-working implement mounted on the tractor for vertical movement to and from the ground, a power lift device having a crank, a bell crank lever carried by the crank and adapted to be angularly adjusted thereon, linkage means for connecting the implement to the bell crank lever, manually movable depth regulating means for effecting angular adjustment of the bell crank lever about the crank, said regulating means being so associated therewith as to remain stationary during the vertical movement of the implement by the power device.

3. In combination, a tractor, a ground working implement mounted on the tractor for vertical movement to and from the ground, a power lift device having a crank, a bell crank lever adjustably carried on the crank, linkage means connecting the bell crank lever with the implement, a quadrant and lever regulating means for regulating the working depth of said implement, and means for connecting said regulating means with said bell crank lever so as to remain stationary during vertical movement of the implement by the power lift device.

4. In a tractor including a power device having a crank arm, an implement structure carried on the tractor for movement by the power device, linkage means connecting the crank arm of the power device with the implement structure to actuate the same including a bell crank journaled on the crank arm, and manual means for regulating the working position of the implement structure associated with the bell crank and to adjust the relative position of the same on the crank arm, said regulating means being so associated as to remain stationary during movement of the implement structure by the power device.

5. In combination, an implement carrying frame, an implement structure mounted for movement on the frame, a power-operated crank mounted for movement on the frame, a bell crank lever mounted for adjustment on the crank, means for connecting the implement structure with the lever to be actuated by the same, and manual means for regulating the working position of the implement structure associated with the bell crank and to adjust the relative position of the same on the crank, said regulating means being so associated as to remain stationary when the crank is operated.

6. In combination, a tractor, an implement mounted for movement on the front of the tractor, a power lift device having a crank arm and mounted at the rear of the tractor, a lever mounted for adjustment on the crank arm, a lift pipe connecting the lever with the implement to operate the same, and manual means associated with the lever to adjust the lever on the crank arm and thereby effect change in the working depth of the implement.

7. In combination, a tractor, an implement mounted for movement on the front of the tractor, a power lift device mounted at the rear of the tractor and having a crank arm, a lever mounted for angular adjustment on the crank arm, a lift pipe connected with the lever to be operated by the same, and manual means associated with the lever to angularly adjust the same on the crank arm and thereby effect change in the working depth of the implement.

8. In combination, an implement-carrying frame, an implement connected to said frame for movement relative thereto, a crank mounted for operation on said frame, an adjustable means mounted on the crank and operatively connected with the implement to adjust the same, and means independent of the operation of the crank to regulate the adjustable means.

9. In combination, an implement-carrying frame, a ground-working implement mounted on said frame for vertical movement to and from the ground, a power-operated crank mounted for operation on said frame, an adjustable means mounted on the crank and operatively connected with the implement to adjust the same, and means independent of the operation of the crank to regulate the adjustable means to vary the working depth of the implement.

10. In combination, an implement-carrying frame, an implement connected to said frame for movement relative thereto, a crank mounted for operation on said frame, a lever angularly adjustable on the crank and operatively connected with the implement to adjust the same, and means independent of the operation of the crank to regulate the adjustable lever.

11. In combination, a tractor, a ground-working implement mounted on the tractor for vertical movement to and from the ground, a power-operated crank mounted for operation on the tractor, a lever angularly adjustable on the crank and operatively connected with the implement to adjust the same, and means independent of the operation of the crank to regulate the adjustable lever to vary the working depth of the implement.

12. In combination, an implement-carrying frame, an implement connected to said frame for movement relative thereto, a crank mounted for operation on said frame, an angularly adjustable bell crank lever mounted on the crank and having two arms, means for operatively connecting one of the arms with the implement, a quadrant mounted on said frame, a manual adjusting lever cooperating with the quadrant, and a link connecting the manual lever with the other of the bell crank arms, said quadrant, lever and link forming means independent of the operation of the crank to regulate the adjustable bell crank lever.

13. In combination, a tractor, a ground-working implement mounted on the tractor for vertical movement to and from its ground-working position, a power-operated crank mounted for operation on the tractor, an angularly adjustable bell crank lever mounted on the crank and having two arms, means for operatively connecting one of the arms with the implement, a quadrant mounted on said tractor, a manual adjusting lever cooperating with the quadrant, and a link connecting the manual lever with the other of the bell crank arms, said quadrant, lever and link forming means independent of the operation of the crank to vary the working depth of the implement.

14. In combination, a tractor, a ground-working implement mounted on the front of the tractor for vertical movement to and from its ground-working position, a crank mounted at the rear of the tractor, an adjustable means mounted on the crank, a lift rod connecting the adjustable means with the implement at the front of the tractor, and manual means associated with the adjustable means to adjust the same on the crank and to thereby change the working depth of the implement.

15. In combination, a tractor, a ground-working implement mounted on the front of the tractor for vertical movement to and from its ground-working position, a power-operated crank mounted at the rear of the tractor, an angularly adjustable means mounted on the crank, a lift rod connecting the angularly adjustable means with the implement at the front of the tractor, and manual regulating means associated with the angularly adjustable means to adjust the same on the crank and to thereby change the working depth of the implement.

16. In combination, a tractor, a ground-working implement mounted on the front of the tractor for vertical movement to and from its ground-working position, a power-operated crank mounted for operation on the tractor, a bell crank lever angularly adjustable on the crank and having two arms, a lift rod connecting one of the arms of the bell crank lever with the implement at the front of the tractor, and manual regulating means associated with the other arm of the bell crank to adjust the same on the crank and to thereby change the working depth of the implement.

JAMES MORKOSKI.